US012541178B2

(12) United States Patent
Navarro

(10) Patent No.: US 12,541,178 B2
(45) Date of Patent: Feb. 3, 2026

(54) TIMER FOR TODDLERS

(71) Applicant: Julie Navarro, Durham, NC (US)

(72) Inventor: Julie Navarro, Durham, NC (US)

( * ) Notice: Subject to any disclaimer, the term of this patent is extended or adjusted under 35 U.S.C. 154(b) by 447 days.

(21) Appl. No.: 18/142,137

(22) Filed: May 2, 2023

(65) Prior Publication Data

US 2024/0369974 A1 Nov. 7, 2024

(51) Int. Cl.
*G04F 1/00* (2006.01)

(52) U.S. Cl.
CPC .................................... *G04F 1/005* (2013.01)

(58) Field of Classification Search
CPC ........................................................ G04F 1/005
See application file for complete search history.

(56) References Cited

U.S. PATENT DOCUMENTS 5,119,346 A * 6/1992 Henderson .............. G04F 1/005 368/187
5,933,391 A * 8/1999 Uptegraph .............. G04F 1/005 368/69
6,872,899 B2 * 3/2005 Oshio .................. G04B 37/106 200/341
8,235,587 B2 * 8/2012 Hiranuma ............ G04B 19/286 368/295
8,295,130 B2 * 10/2012 Claessens ................ G04G 9/02 368/256
8,547,801 B2 * 10/2013 Zorn ...................... G04G 11/00 368/241
10,078,311 B1 * 9/2018 Chong ................ G06F 3/03545
2003/0123330 A1 * 7/2003 Carter ...................... G04F 1/005 368/109
2005/0254353 A1 * 11/2005 Cogoli ................... G04G 21/00 368/281
2006/0120218 A1 * 6/2006 Lansing ................ A61J 7/0409 368/10
2007/0047392 A1 * 3/2007 Parkinson .......... G09B 19/0076 368/108
2014/0198623 A1 * 7/2014 Hill ........................ G04B 47/00 368/10
2020/0396873 A1 * 12/2020 Salem ................. G06F 3/04847

* cited by examiner

*Primary Examiner* — Edwin A. Leon
*Assistant Examiner* — Jason M Collins
(74) *Attorney, Agent, or Firm* — Ashley D. Johnson; Dogwood Patent and Trademark Law

(57) ABSTRACT

The invention is a portable preset timer designed for a toddler that can be worn as a watch or clipped on. The timer includes a front and opposed rear face with a plurality of lugs positioned at the outer edge of the timer. The timer also includes a plurality of buttons on the front timer face that are configured to start and stop a timer countdown. Each button is controlled by a lock positioned on the outer perimeter of the lock.

15 Claims, 4 Drawing Sheets

TIMER FOR TODDLERS

FIELD OF INVENTION

The present invention relates to a novel preset timer created and designed for toddlers to use and carry around.

BACKGROUND

Current timers are not intended to be used by toddlers. A person needs to set the seconds, minutes, or hours in current timers, which is difficult to use for a toddler. Pre-set timers currently available are not directed or designed for toddlers to enable and use. Toddlers need a timer that is easy to use, evident, preset, and portable. Timers are being used by caregivers with toddlers to prevent tantrums by making them feel in control and involved over situations or transitions. Giving toddlers their own timers to start and carry around will give them the sense of independence and control that they crave.

SUMMARY

The following is intended to be a brief summary of the invention and is not intended to limit the scope of the invention.

The present disclosure is for a preset timer created and designed for toddlers. This device can be preset with two timer buttons but is not limited to only two timer preset buttons (e.g., 2, 3, 4, or more buttons), making it easy and evident for the toddler or preschooler to use.

The disclosure has the flexibility to be used as a watch or to clip it on clothes or any object, making it portable and easy to carry around.

The toddler will be able to enable the timer and turn it off on his or her own by pushing the buttons.

These and other aspects of the present invention will be apparent to those skilled in the art after a reading of the following description of the preferred embodiments when considered in conjunction with the drawings. It should be understood that both the foregoing general description and the following detailed description are exemplary and explanatory only and are not restrictive of the invention as claimed.

In some embodiments, the invention is directed to a timer comprising a front face and an opposed rear face. The timer includes a plurality of lugs positioned at an outer edge of the timer. The timer further includes a plurality of buttons positioned on the front face, wherein the buttons are configured to start and stop a timer countdown. Each of the plurality of buttons is controlled by an associated lock positioned on an outer perimeter of the timer, each lock having a first position in which an associated button is locked and a second position in which an associated button is unlocked.

In some embodiments, the first position of each lock is configured such that the associated timer cannot be initiated.

In some embodiments, each button includes an indicator printed or shown on the button.

In some embodiments, the second position of each lock is configured such that the associated timer can be initiated by pushing an associated button.

In some embodiments, the timer includes two or more buttons.

In some embodiments, the timer includes a first lug positioned at a first edge and a second lug positioned at an opposed edge of the timer.

In some embodiments, each lock is positioned adjacent to an associated button.

In some embodiments, the rear face comprises a clip on device.

In some embodiments, the timer further includes a strap positioned through the lugs.

In some embodiments, the strap includes a hook and loop closure at one end and a buckle at one end.

In some embodiments, the timer includes a light or auditory tone that is activated when a timer has expired.

In some embodiments, the invention is directed to a method of using a timer. The method includes providing the disclosed timer, wherein each of the plurality of buttons is controlled by an associated lock positioned on an outer perimeter of the timer, each lock having a first position in which an associated button is locked and a second position in which an associated button is unlocked. The method includes initiating a lock to a first position, such that the associated button can be pressed to initiate a set time countdown. The timer front face is illuminated, an audible noise sounds, or both when the time countdown has expired.

In some embodiments, the timer includes a strap that is positioned around a user's wrist.

In some embodiments, the user is a toddler.

BRIEF DESCRIPTION OF THE DRAWINGS

Some embodiments of the present invention are illustrated as an example and are not limited by the accompanying drawings, which are not necessarily drawn to scale and wherein.

DETAILED DESCRIPTION

The terminology used herein is for the purpose of describing particular embodiments only and is not intended to be limiting of the invention.

The present disclosure is to be considered as an exemplification of the invention and is not intended to limit the invention to the specific embodiments illustrated by the figures or description below.

Figure 1:
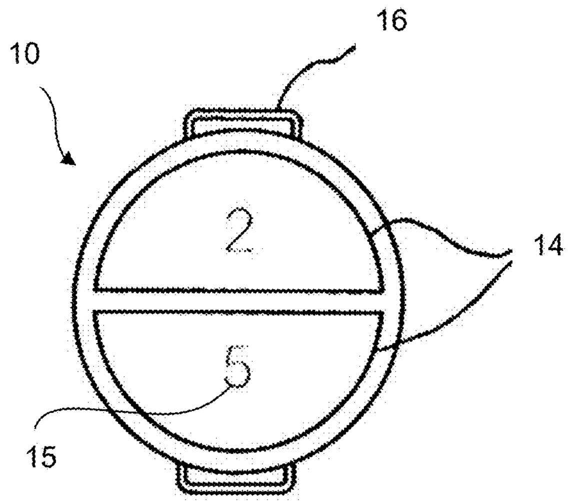
FIG. 1—Illustrates an example of the front view of the case of the timer, showing the two buttons that showcase the preset minutes for the timer on the top and bottom of the case to attach the strap according to various embodiments described herein.

The present invention will now be described by referencing the appended figures representing preferred embodiments. FIG. 1 depicts an example of the portable timer front case 10, which includes but it is not limited to two preset minute timer buttons 14. Each button shows the preset minute number indicator 15 which can have any value (e.g., 1, 2, 3, 4, 5, or more minutes). When the timer goes off the button will light up and make an alarm sound; the light and alarm will stop once the mentioned button 14 is pressed. The case of the timer can be made of plastic but is not limited to other materials, such as metal or resin. The case of the timer can be configured in any size, such as (but not limited to) 28 millimeters. As shown in FIG. 1, the case can be round but is not limited to other shapes.

Figure 2:
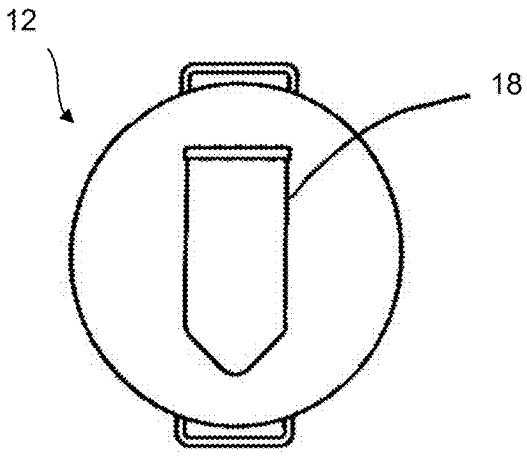
FIG. 2—Depicts the back view of the timer, which includes a clip on device according to various embodiments of the present invention.

FIG. 2 shows back 12 of the case of the timer, which includes clip on device 18 made of metal (but can be constructed from any other suitable material or materials, such as plastic). The clip on device is to give a different option of portability to the timer. The timer can be clipped on clothes or any material where the timer can be hung. It should be appreciated that clip on device 18 is optional, and the timer can be configured without this element in some embodiments.

Figure 3:
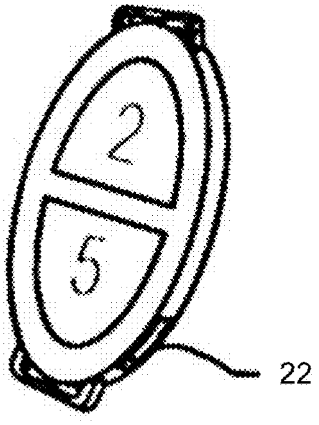
FIG. 3—Shows the left side perspective view of the case band of the timer where a lock is placed on the lower side according to various embodiments described herein.

FIG. 3 depicts the left side view of the timer showing the case band. On the lower left side of the case band of the timer, lock 22 that controls the lower preset timer button 15 is located. When lock 22 is positioned upward, the lower timer button can be set, and the timer is enabled to start. When the 22 lock is positioned downward, the lower timer button is locked, and the timer cannot be enabled.

Figure 4:
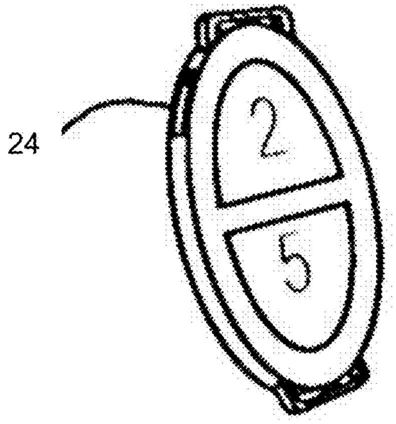
FIG. 4—Shows the right side perspective view of the case band of the timer where a lock is placed on the upper side according to various embodiments described herein.

FIG. 4 shows the right side view of the timer showing the case band. On the upper right side of the case band of the timer, lock 24 that controls the lower preset timer button is located. When lock 24 is positioned upward, the upper timer button can be set and the timer is enabled to start. When lock 24 is positioned downward, the upper timer button is locked, and the timer cannot be enabled. The locks permit parental control to enable or disable the timer.

Figure 5:
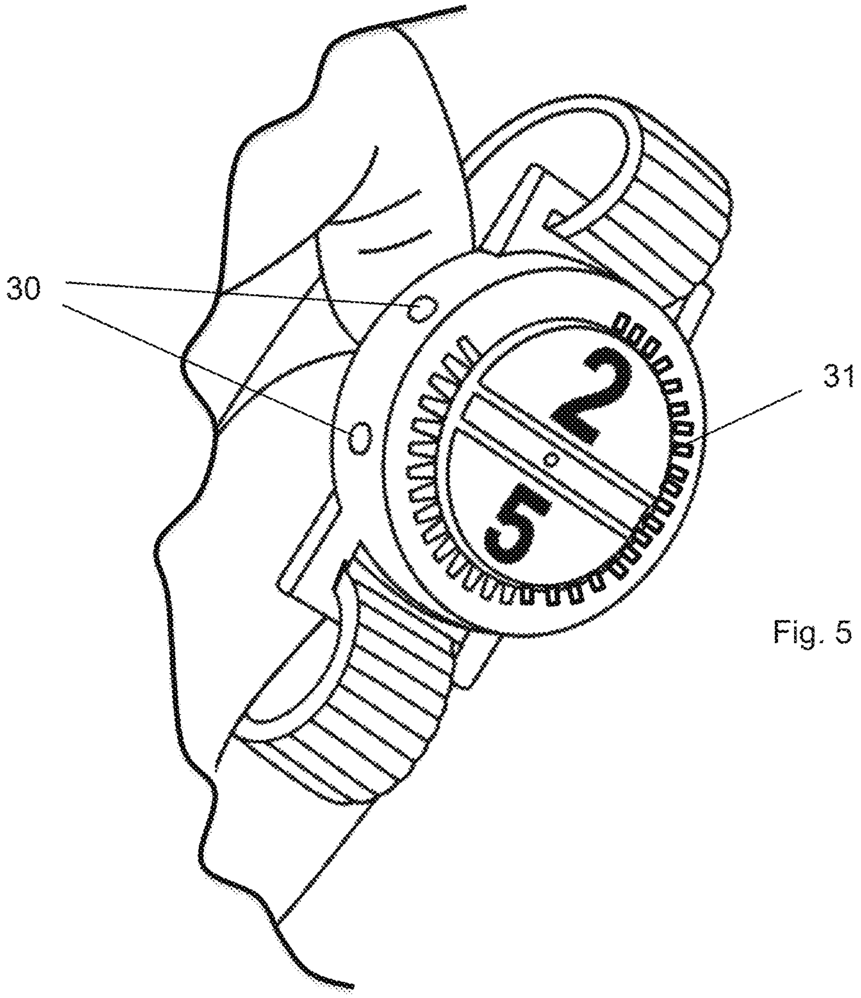
FIG. 5 is a perspective view of the front face of the timer illustrating two side control buttons in accordance with some embodiments of the presently disclosed subject matter.

FIG. 5 illustrates one embodiment of the time illustrating that the lock 22 as indicated above can be configured as one or more "parental control" buttons 30. For example, two buttons 30 can be positioned on a right and/or left side of the timer. Thus, one of buttons 30 can be pressed to begin the timer, while the other button can be pressed to stop the timer and/or lock the timer so that it cannot be activated.

Figure 6:
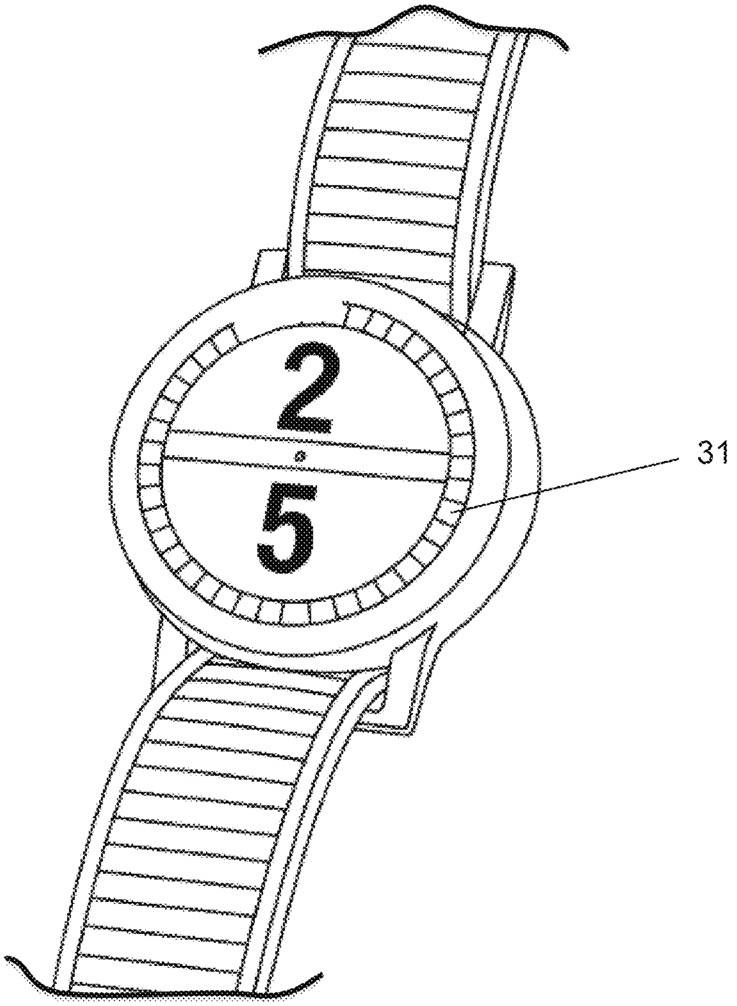
FIG. 6 is a front view of a timer with a visual time tracker in accordance with some embodiments of the presently disclosed subject matter.

FIG. 6 illustrates one embodiment of the timer that includes visual time tracker 31 that can be in the form of a visual indicator. As shown, the visual time tracker can illuminate around the front face of the timer, visually showing the user or a parent immediately how much time is remaining. In some embodiments, visual time tracker 31 can begin fully illuminated and will decrease in illumination as the time proceeds. Thus, by the end of the timer, none of the illumination is present. The visual time tracker can be positioned in any suitable location, such as around the front face.

Figure 7:
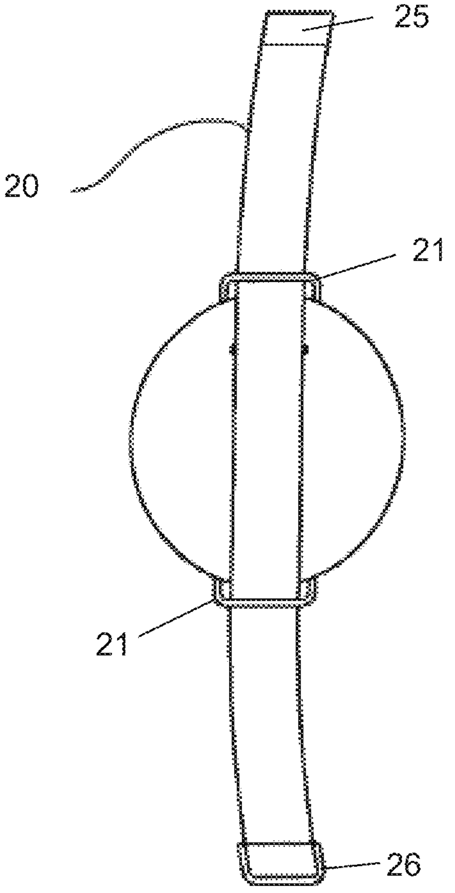
FIG. 7—Depicts an example of the back of the timer with the strap through the lugs of the timer case according to various embodiments described herein.
Figure 8:
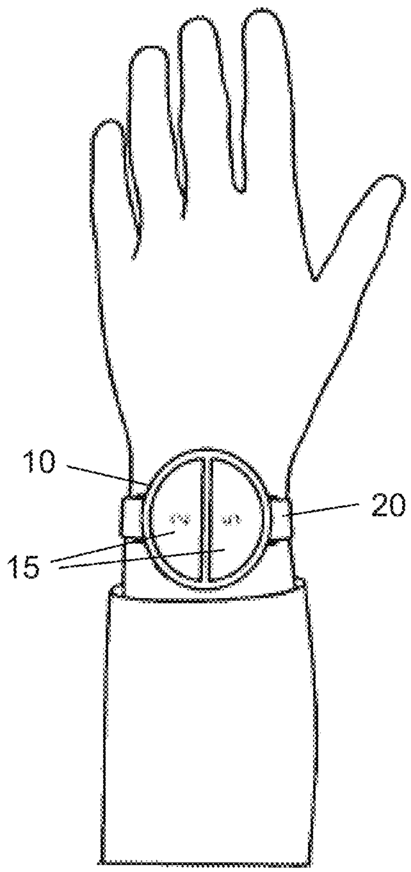
FIG. 8—Illustrates an example of the timer worn around a wrist according to various embodiments described herein.

FIG. 7 depicts the back of the timer with strap 20 placed through lugs 21 to be worn over the wrist. The strap can have any suitable width, such as about 16 millimeters and any suitable length, such as about 160 millimeters, but not limited to other sizes. Strap 20 can be made of nylon but is not limited and can include other materials. In some embodiments, the strap can include a hoop and loop fastener 25 on one end and buckle 26 on the other end of the strap. The hoop and loop fastener end of the strap will go through buckle 26 and fold towards the strap to allow the strap to be tightened around the wrist before cinching closed as shown on FIG. 8. The slide-through buckle with the wrap-around-wrist hoop and loop fastener will keep the timer tight to the wrist of the toddler.

What is claimed is:

1. A timer comprising:

a front face and an opposed rear face;

a plurality of lugs positioned at an outer edge of the timer;

a plurality of preset buttons positioned on the front face, wherein the buttons are configured to start and stop a timer countdown;

a plurality of manual locks positioned on an outer perimeter of the timer, each lock directly adjacent to and associated with a corresponding one of the plurality of preset buttons, each lock being independently moveable between a locked position in which the corresponding one of the plurality of buttons is physically obstructed from actuation and an unlocked position in which the corresponding one of the plurality of buttons is able to be actuated.

2. The timer of claim 1, wherein the first position of each lock is configured such that the associated timer cannot be initiated.

3. The timer of claim 1, wherein each button includes an indicator printed or shown on the button.

4. The timer of claim 1, wherein the second position of each lock is configured such that the associated timer can be initiated by pushing an associated button.

5. The timer of claim 1, comprising two buttons.

6. The timer of claim 1, comprising a first lug positioned at a first edge and a second lug positioned at an opposed edge.

7. The timer of claim 1, wherein each lock is positioned adjacent to an associated button.

8. The timer of claim 1, wherein the rear face comprises a clip on device.

9. The timer of claim 1, further comprising a strap positioned through the lugs.

10. The timer of claim 9, wherein the strap includes a hook and loop closure at one end.

11. The timer of claim 9, wherein the strap includes a buckle at one end.

12. The timer of claim 1, configured with a light or auditory tone that is activated when a timer has expired.

13. A method of using a timer, the method comprising:

providing the timer of claim 1;

initiating one of the manual locks to the unlocked position, such that the corresponding button can be pressed to initiate a set time countdown;

wherein the timer front face is illuminated, an audible noise sounds, or both when the time countdown has expired.

14. The method of claim 13, wherein the timer includes a strap that is positioned around a user's wrist.

15. The method of claim 14, wherein the user is a toddler.

* * * * *